INVENTOR.
JAMES R. WEST

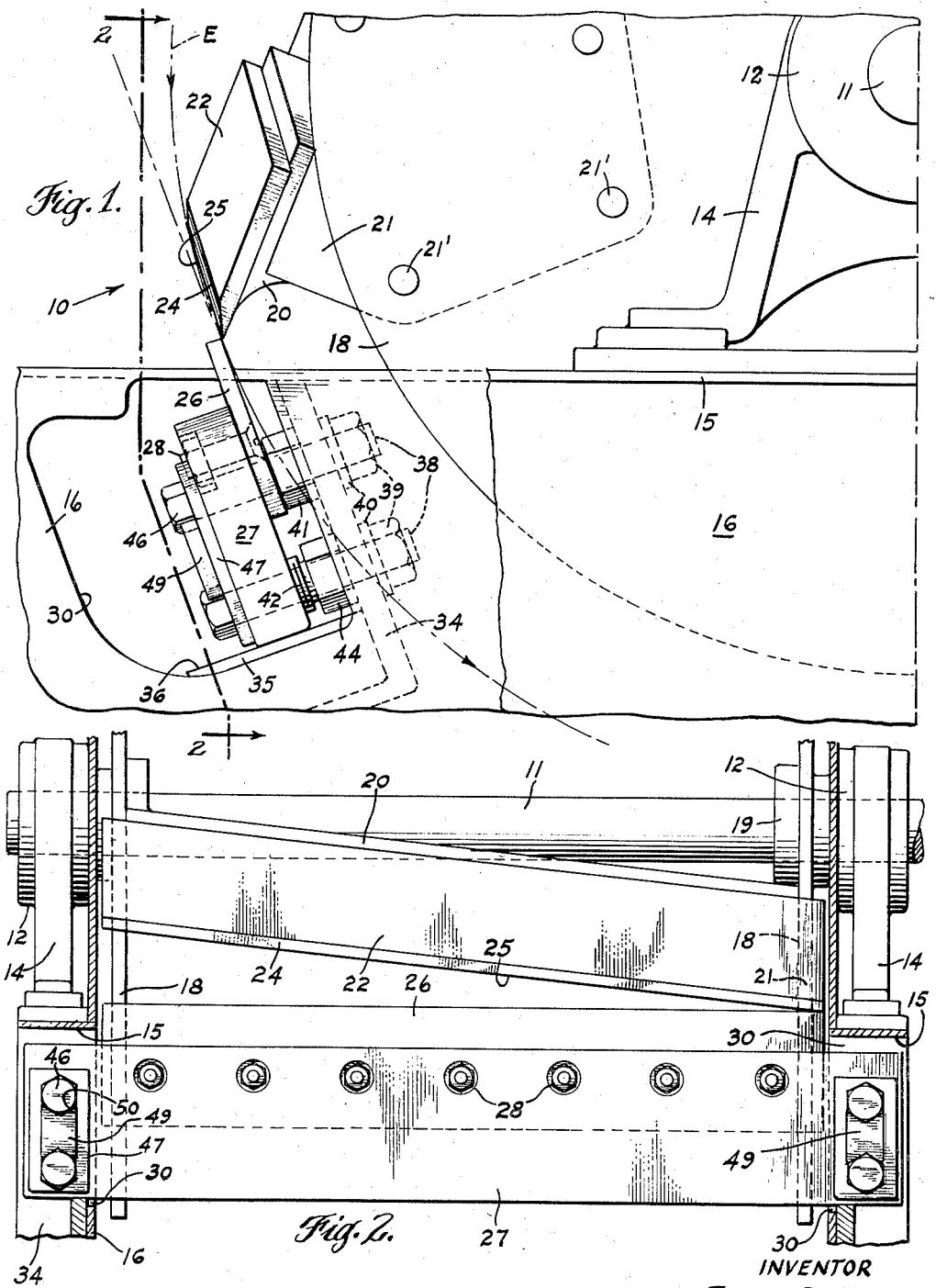

UNITED STATES PATENT OFFICE 2,863,481
Patented Dec. 9, 1958

2,863,481

SHEAR BAR MOUNTING

James R. West, New Holland, Pa., assignor to Sperry Rand Corporation, New Holland, Pa., a corporation of Delaware Application September 17, 1956, Serial No. 610,302

3 Claims. (Cl. 146—117)

The present invention relates generally to reel type cutting or chopping mechanisms. More particularly, the invention relates to an improved disposition of a shear bar relative to a cooperative cutting reel.

In my U. S. Patent No. 2,735,469, issued February 21, 1956, there is shown a cutting reel having a plurality of knives operable successively with a shear bar to comminute crop material. The cutter reel knives are so disposed that they generate a hypothetical hyperbolic cutting edge on rotation of the reel. The shear bar is bowed toward the reel; and when viewed from the side, it extends vertically (see Figs. 3–7 of the patent) with its cutting edge disposed at a point below a horizontal plane intersecting the axis of the cutting reel. The upper end of the shear bar is chamfered or relieved to provide a sharp cutting edge; and, if a line is projected upwardly from any given point on the side of the shear bar facing the cutting reel, such line will form a chord on the hyperboloid generated by the knives of the cutting reel.

In this mechanism, the crop material moves toward the cutting reel and over the shear bar, being engaged from above by the cutter reel knives. The material is directed downwardly and against the shear bar chamfer, tending to force the shear bar inwardly or toward the cutting reel. Further, just before each cutter reel knife comes down into cooperative engagement with the shear bar, its cutting edge is laterally displaced outwardly beyond a chord line projected upwardly from the side of the shear bar facing the cutting reel. As a result, each knife produces downward and inward forces against the shear bar.

The cutter head shown in my above identified patent is adapted to rotate at from 800 to 900 R. P. M.; and, it has considerable momentum when in operation. The mechanism is capable of comminuting a great volume of crop material (45 tons of material per hour) delivered from an appropriate feed mechanism. Occasionally, a rock, a length of irrigation pipe, or other foreign object is delivered with the crop material into the chopping mechanism. When the cutter reel engages that foreign object, it forces the object against the chamfered shear bar, thereby tending to displace the bar inwardly. If the displacing force is great enough, the shear bar will be moved inwardly eliminating the clearance between the shear bar and the reel knives. This causes the reel knives to crash against the shear bar causing destruction to the mechanism.

The primary object of this invention is to so dispose a shear bar relative to a cutting reel, in a cutting mechanism of the character described, that if a foreign object enters the mechanism between the shear bar and the cutting reel, forces are developed which direct or displace the shear bar away from the cutting reel and not toward it.

Another object of this invention is to so mount a shear bar in a mechanism of the character described that a bar which is rectangular in cross-section may be advantageously employed.

Other objects of this invention will be apparent hereinafter from the specification and from the recital in the appended claims.

In the drawings:

Fig. 1 is a fragmentary, partially generally diagrammatic, side elevation of a cutter reel and its cooperative shear bar, the shear bar being disposed relative to the cutting reel according to this invention;

Fig. 2 is a section taken on the lines 2—2 of Fig. 1 and looking in the direction of the arrows.

Figure 3:
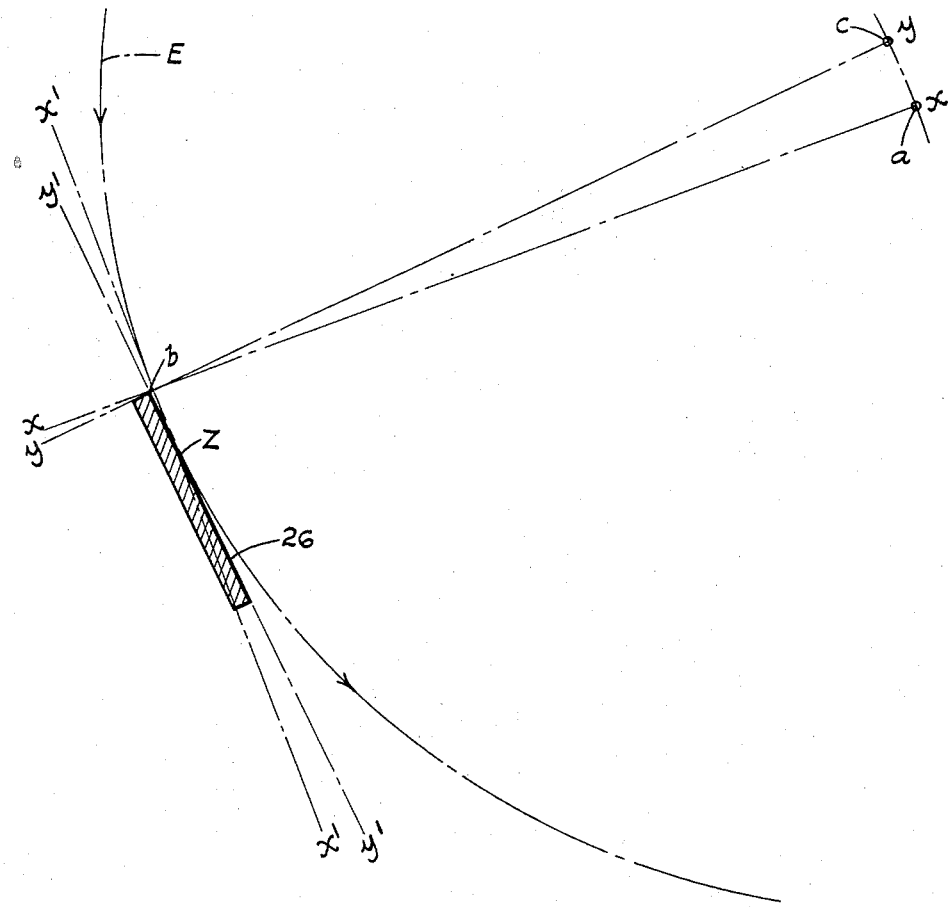
Fig. 3 is a schematic view illustrating, in exaggerated form, the principle of applicant's invention.

Referring now to the drawing by numerals of reference, and first to Figs. 1 and 2, 10 denotes generally a cutter reel of the type shown in U. S. Patent No. 2,735,-469, previously referred to. Reel 10 is mounted on a shaft 11 driven from a source of power, not shown. Shaft 11 is journaled for rotation in spaced bearings 12 supported on pedestals 14 mounted on out-turned flange portions 15 of a frame 16. The cutter reel includes a pair of relatively spaced, parallel discs 18 having their hubs 19 keyed to shaft 11. Extending between discs 18 are a plurality of knife supports 20 having end plates 21 bolted, riveted, or otherwise secured at 21' to the discs. Each support 20 carries a knife 22 beveled at 24 to provide a cutting edge 25.

As described fully in the above mentioned patent, knives 22 are mounted so that they extend at an angle to the rotational axis of the reel (Fig. 2); and, the cutting edges 25 of the knives 22 generate a hyperboloid cutting edge denoted E. To obtain a good cutting action, the stationary knife or shear bar 26 of the mechanism is mounted so that it is bowed toward reel 10 to closely approximate the hyperbolic curve generated. The manner in which the shear bar is mounted so that it is properly curved, plays no part in the present invention. The bar may be bolted to a support which is provided with the desired curve so that the bar assumes the curve of the support. Also, it may be mounted on a support 27 (Figs. 1 and 2) by means of a plurality of bolts 28, the shear bar support bores which receive the bolts 28 being counterbored to varying depths from the side facing the shear bar to receive spacer-washers (not shown), such washers projecting from the counterbores varying distances so that when the shear bar is bolted tightly into engagement with the washers, it becomes bowed relative to its support.

Each side wall of mechanism frame 16 is provided with an opening 30 through which one end of support bar 27 projects. A pair of adjustment supporting devices are provided, one for each end of the support 27. Each device comprises a support or bracket 34 which extends at an incline relative to the vertical axis of the cutter mechanism (Fig. 1). Bracket 34 has a transverse portion 35 which provides a guide or ledge 36 on which the bottom of the support 27 seats. The support is connected to brackets 34 by a pair of tension bolts 38 having associated nuts and lock-washers 39 and 40, respectively. Interposed between tension bolts 38 and shear bar support 27, and between the holder and support 34 is a pair of thimbles 41, each of which comprises an externally threaded shank portion 42 which threads into support 27, and an enlarged hexagonal head 44. The thimbles are bored to receive the tension bolts.

Tension bolts 38 have heads 46 which seat against a flat washer plate 47 interposed between these heads and support 27. Welded to the outer face of plate 47 is a lock plate 49 having a V-shaped pocket 50 (Fig. 2) at each end engaging a bolt head 46 and preventing it from turning because of vibrations or other reasons during the operation of the chopping mechanism.

Adjustment of the stationary knife or shear bar 26 toward or away from reel 10 is achieved by first loosening nuts 39. This frees the thimbles 41 from the vice-like clamp between bracket 34 and washer plate 47 and shear bar support 27 and permits rotation of the thimbles. The operator then adjusts the thimbles, moving the heads 44 toward or away from knife support 27. After thimbles 41 have been adjusted, nuts 39 are again tightened to clamp the thimbles in adjusted position. The disposition of the shear bar relative to the cutting edge E of the knives of the cutter head 10 can be examined, and if satisfactory, the mechanism may be operated. If the amount of adjustment is not satisfactory, nuts 39 can be loosened and thimbles 41 adjusted further until a desired position of the shear bar relative to the cutter reel is obtained.

The hexagonal heads of the adjustment thimbles makes it possible to rotate the thimbles in uniform small increments. By aligning a hexagonal flat with a straight surface on the machine and then turning the thimble to bring the next hexagonal flat into alignment with said surface, a precise adjustment may be obtained.

Referring to Fig. 1, it will be seen that the knife support 27 seats on the guide or ledge 36 of the portion 35 of bracket 34. The perpendicular extension of the knife support relative to ledge 36 establishes the angular extension of the shear bar relative to the knives 22 on the cutter head.

Instead of mounting shear bar 26 so that it extends vertically, as shown in my aforementioned patent, whereby a line projected upwardly from the side of the shear bar facing the cutter reel would form a chord on the hyperbolic edge generated, the shear bar is mounted as illustrated schematically in Fig. 3.

Reference $a$ denotes the center of the cutter reel 10 and E, the hyperbolic cutting edge generated by the reel knives 22. Line X—X extends from the center $a$ of the reel to the cutting edge $b$ of the shear bar 26. X'—X' is a line perpendicular to line X—X, and it will be apparent that the shear bar does not likewise extend perpendicular to line X—X. Instead, the bar is mounted according to this invention perpendicular to line Y—Y extending between cutting edge $b$ of the shear bar and a point $c$ disposed above the center $a$ of the reel. As a result, the side of the shear bar facing the reel extends on a line Y'—Y' which with line X—X forms an angle of less than 90°. The generated edge E comes closest to the shear bar at a point Z below the cutting edge $b$. Thus, it will be evident that all of the forces against the shear bar will tend to displace the bar away from the cutter reel and not toward it. Any chance of the shear bar being displaced inwardly and into the path of the cutter reel knives if a foreign object enters the mechanism is, therefore, prevented.

In the actual mounting of the shear bar, point Z is displaced from E an amount sufficient to provide operating clearance between the shear bar and the cutter reel knives. The edge $b$ is only a few thousandths of an inch further away from edge E than point Z, and well within an allowable clearance range to provide a good cutting action with the cutter reel. The dimensions shown in Fig. 3 are greatly exaggerated, so that the invention may be readily understood.

It is the guide or ledge 36 on which support 27 seats that provides the proper extension of shear bar 26. Ledge 36 is carefully positioned in manufacture to extend parallel to a line corresponding to line Y—Y. The proper disposition of the shear bar is thus easily obtained. The operator installing, adjusting, or replacing the shear bar need only be certain that support 27 seats solidly on ledge 36.

While this invention has been described in connection with a particular embodiment thereof, and in conjunction with a particular cutter mechanism, it will be understood that it is capable of further modification and other uses, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention what I claim is:

1. A cutting mechanism comprising a frame, a reel mounted on said frame, a knife mounted on said reel and facing in the direction of rotation of the reel, said knife generating a theoretical circle on rotation of said reel, a fixed shear bar having a cutting edge cooperative with said knife, said shear bar having a side facing said theoretical circle and said cutting edge being on one edge of said side, and means for mounting such shear bar on said frame with said side extending in a plane which at no point crosses said theoretical circle and being closest to the circle at a point approximate to but spaced from said cutting edge toward the edge of said side opposite said one edge.

2. A cutting mechanism comprising a reel rotatable on a fixed horizontal axis, a knife mounted on said reel and facing in the direction of rotation of the reel, said knife generating a theoretical circle on rotation of said reel, an upwardly extending fixed shear bar having a cutting edge cooperative with said knife, said shear bar being disposed below a horizontal plane including said axis and having a side facing said theoretical circle, said cutting edge of said shear bar being along the upper edge of said side, and means for mounting said shear bar with said side extending in a plane which at no point crosses said theoretical circle and being closest to the circle at a point approximate to but spaced below said cutting edge, a vertical plane including said cutting edge being closer to said axis than said theoretical circle where the circle intersects said horizontal plane.

3. A cutting mechanism as recited in claim 2 wherein said shear bar is rectangular in cross section, said mounting means including a support member to which said shear bar is fastened, a bracket, said bracket having a guide surface extending perpendicular to the plane of extension of said side of said shear bar and on which said support member seats.

References Cited in the file of this patent

UNITED STATES PATENTS

| | | |
|---|---|---|
| 100,941 | Smith | Mar. 15, 1870 |
| 1,221,364 | Neu | Apr. 3, 1917 |
| 2,341,913 | Fields | Feb. 15, 1944 |
| 2,399,529 | Willits | Apr. 30, 1946 |